(12) United States Patent
Ye et al.

(10) Patent No.: US 12,538,239 B2
(45) Date of Patent: Jan. 27, 2026

(54) POWER CONTROL METHOD AND APPARATUS, AND COMMUNICATION NODE, AND STORAGE MEDIUM

(71) Applicant: ZTE CORPORATION, Shenzhen (CN)

(72) Inventors: Xinquan Ye, Shenzhen (CN); Yijian Chen, Shenzhen (CN); Zhaohua Lu, Shenzhen (CN); Guanghui Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 452 days.

(21) Appl. No.: 18/005,823

(22) PCT Filed: Jul. 5, 2021

(86) PCT No.: PCT/CN2021/104499
§ 371 (c)(1),
(2) Date: Jan. 17, 2023

(87) PCT Pub. No.: WO2022/012362
PCT Pub. Date: Jan. 20, 2022

(65) Prior Publication Data
US 2023/0345379 A1  Oct. 26, 2023

(30) Foreign Application Priority Data

Jul. 15, 2020  (CN) .......................... 202010682880.0

(51) Int. Cl.
*H04W 52/24* (2009.01)
(52) U.S. Cl.
CPC ................ *H04W 52/241* (2013.01)
(58) Field of Classification Search
CPC ..... H04W 24/02; H04W 88/08; H04W 28/18; H04W 52/143; H04W 52/225;
(Continued)

(56) References Cited

U.S. PATENT DOCUMENTS

2012/0083300 A1   4/2012   Abgrall et al.
2014/0135055 A1   5/2014   Fu et al.
(Continued)

FOREIGN PATENT DOCUMENTS

CN   103476101 A   12/2013
CN   104285485 A   1/2015
(Continued)

OTHER PUBLICATIONS

Extended European Search Report in Application No. 21842872.0, dated Jul. 8, 2024, 10 pages.
(Continued)

*Primary Examiner* — Quoc Thai N Vu
(74) *Attorney, Agent, or Firm* — Morgan, Lewis & Bockius LLP

(57) ABSTRACT

Provided are a power control method and apparatus, a communication node, and a storage medium. The power control method includes: acquiring initial power control information, where the initial power control information includes a power control parameter of each of access points (APs) providing a service for each of terminals, the number of the terminals is K, K is an integer greater than 1, the number of the access points is M, and M is an integer greater than 1; determining SINR of the K terminals according to the initial power control information and determining L target SINRs, where L is a positive integer; and adjusting a power control parameter of a target AP according to the SINRs of the K terminals and the L target SINRs until an iteration adjustment stop condition is satisfied, and an adjusted power control parameter is obtained.

20 Claims, 3 Drawing Sheets

Acquire initial power control information, where the initial power control information includes a power control parameter of each of access points (APs) providing a service for each of terminals, the number of the terminals is K, K is an integer greater than 1, the number of the access points is M, and M is an integer greater than 1  — 110

Determine signal to interference plus noise ratios (SINRs) of the K terminals according to the initial power control information, and determine L target SINRs, where L is a positive integer  — 120

Adjust a power control parameter of a target AP according to the SINRs of the K terminals and the L target SINRs until an iteration adjustment stop condition is satisfied, and obtain an adjusted power control parameter  — 130

(58) Field of Classification Search
CPC ............ H04W 52/226; H04W 52/241; H04W 52/243; H04W 84/12; H04W 52/386; H04W 84/18; H04B 17/336; H04B 17/373; H04L 41/0823
See application file for complete search history.

(56) References Cited

U.S. PATENT DOCUMENTS

| | | | |
|---|---|---|---|
| 2015/0094114 A1 | 4/2015 | Rao et al. | |
| 2015/0156784 A1 | 6/2015 | Chen et al. | |
| 2016/0037459 A1 | 2/2016 | Swartz et al. | |
| 2016/0227489 A1* | 8/2016 | Oteri .................. | H04W 52/367 |
| 2019/0150005 A1* | 5/2019 | Cendrillon .......... | H04L 41/0823 370/252 |
| 2019/0239124 A1 | 8/2019 | Gacanin et al. | |
| 2020/0396695 A1* | 12/2020 | Bhushan .............. | H04B 17/336 |

FOREIGN PATENT DOCUMENTS

| | | |
|---|---|---|
| CN | 106559863 A | 4/2017 |
| CN | 106788624 A | 5/2017 |
| CN | 107809794 A | 3/2018 |
| CN | 108260196 A | 7/2018 |
| CN | 111901861 A | 11/2020 |
| KR | 101691826 B1 | 1/2017 |
| WO | WO2011/075704 A2 | 6/2011 |

OTHER PUBLICATIONS

Indian Office Action in Application No. 202327009805, dated May 6, 2024, 6 pages.
Search Report in Chinese Application No. 202010682880.0, dated Sep. 26, 2024, 7 pages including translation.
Office Action in Chinese Application No. 202010682880.0, dated Sep. 26, 2024, 15 pages including translation.
International Search Report in Application No. PCT/CN2021/104499, dated Oct. 9, 2021, 4 pages including translation.

* cited by examiner

POWER CONTROL METHOD AND APPARATUS, AND COMMUNICATION NODE, AND STORAGE MEDIUM

CROSS REFERENCE TO RELATED APPLICATIONS

This is a National Stage Application filed under 35 U.S.C. 371 based on International Patent Application No. PCT/CN2021/104499, filed on Jul. 5, 2021, which claims priority to Chinese Patent Application No. 202010682880.0 filed with the China National Intellectual Property Administration (CNIPA) on Jul. 15, 2020, the disclosures of which are incorporated herein by reference in their entireties.

TECHNICAL FIELD

The present application relates to the field of wireless communication networks, for example, to a power control method and apparatus, a communication node, and a storage medium.

BACKGROUND

With the continuous development of communication networks, a service relationship between an access point (AP) and a terminal (such as a user equipment (UE)) becomes more complex. Multiple APs can serve multiple UEs at the same time, which increases the difficulty of power control of multiple APs and multiple UEs. In a power control process, a receiving end, after measuring and estimating signal to interference plus noise ratio (SINR), can feed back corresponding commands to a sending end to notify the sending end of increasing or decreasing power, but this method is only applicable to a single link, i.e., the case where one AP serves one UE and an application scenario in which interference is limited is defined. However, in an application scenario in which multiple APs serve multiple UEs at the same time, there are multiple signal sources and multiple interference sources, so that the interference and the gain cannot be balanced well, and the communication quality cannot be ensured.

SUMMARY

The present application provides a power control method and apparatus, a communication node and a storage medium, so as to improve reliability of power control.

Embodiments of the present application provide a power control method. The power control method includes the following.

Initial power control information is acquired, where the initial power control information includes a power control parameter of each of APs providing a service for each of terminals, the number of the terminals is K, K is an integer greater than 1, the number of the APs is M, and M is an integer greater than 1. Signal to interference plus noise ratios (SINRs) of the K terminals are determined according to the initial power control information, and L target SINRs are determined, where L is a positive integer. A power control parameter of a target AP is adjusted according to the SINRs of the K terminals and the L target SINRs until an iteration adjustment stop condition is satisfied, and an adjusted power control parameter is obtained.

Embodiments of the present application further provide a power control apparatus. The power control apparatus includes an information acquisition module, an SINR determination module and a power control parameter determination module.

The information acquisition module is configured to acquire initial power control information, where the initial power control information includes a power control parameter of each of APs providing a service for each of terminals. The SINR determination module is configured to determine SINRs of K terminals according to the initial power control information, and determine L target SINRs, where K is a positive integer, and L is a positive integer. The power control parameter determination module is configured to adjust a power control parameter of a target AP according to the SINRs of the K terminals and the L target SINRs until an iteration adjustment stop condition is satisfied, and obtain an adjusted power control parameter.

Embodiments of the present application further provide a communication node. The communication node includes one or more processors.

The one or more processors are configured to perform, when executing, the preceding power control method.

Embodiments of the present application further provide a computer-readable storage medium, which is configured to store a computer program, where the computer program, when executed by a processor, implements the preceding power control method.

DETAILED DESCRIPTION

The present application is described hereinafter in conjunction with drawings and embodiments.

Figure 1:
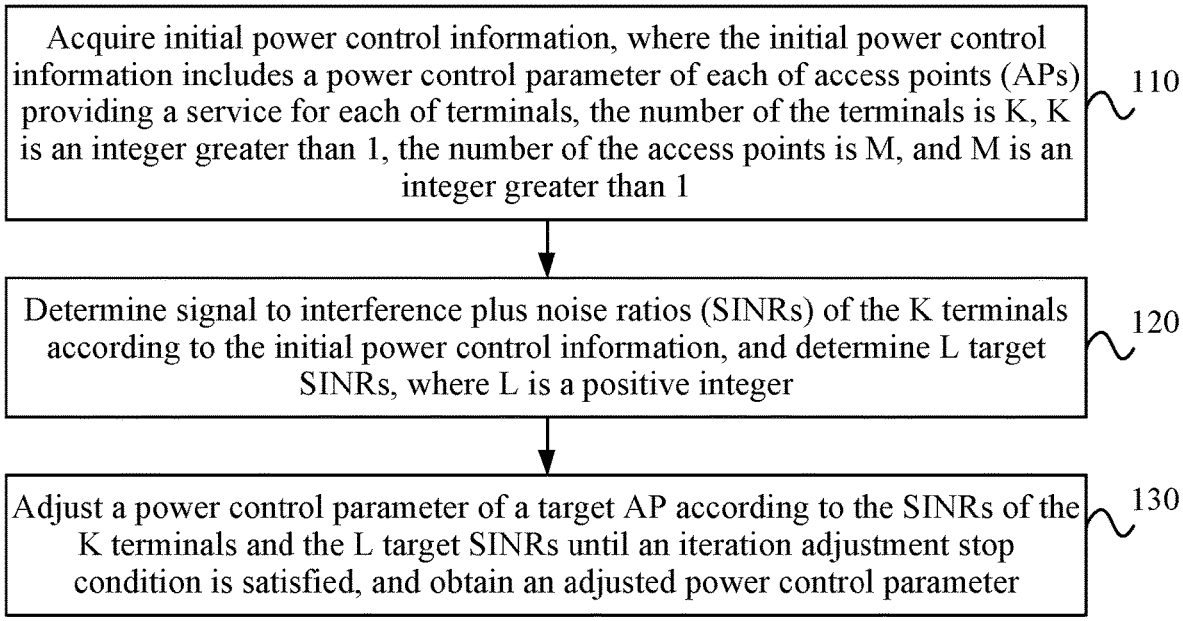
FIG. 1 is a flowchart of a power control method according to an embodiment.

An embodiment of the present application provides a power control method. The method is applicable to a communication node such as a terminal, a base station, or a centralized control device in the wireless network. FIG. 1 is a flowchart of a power control method according to an embodiment. As shown in FIG. 1, the method provided in this embodiment includes operations 110 to 130.

In operation 110, initial power control information is acquired, where the initial power control information includes a power control parameter of each of access points (Aps) providing a service for each of terminals, the number of the terminals is K, K is an integer greater than 1, the number of the access points is M, and M is an integer greater than 1.

In this embodiment, first, the initial power control information is determined, where the initial power control information includes a power control parameter of each AP providing a service for each terminal. If one AP serves one UE, the power control parameter of the one AP to the one UE is non-zero. The initial power control parameter is assigned to each AP providing the service for each terminal, for example, the power of an AP is evenly allocated to UEs served by the AP; or a weight is determined according to channel information (a large-scale parameter, a transient information parameter, etc.) between the AP and the UEs, and the power of the AP is allocated to the corresponding UE in proportion; or one initial power control parameter may be assigned to each AP providing the service for each terminal; or the initial power control parameter may be randomly allocated.

In operation 120, SINRs of the K terminals are determined according to the initial power control information, and L target SINRs are determined, where L is a positive integer.

In this embodiment, an SINR of each terminal is determined according to the initial power control information, and target SINRs are determined. Based on this, the power control parameter of the target AP is adjusted. The SINR of each terminal may be determined according to channel information, precoding information, power control information, user data information, coordination set information, noise information, and the like. The target SINRs are used for dividing SINR levels, and the L target SINRs are different from each other. According to an SINR level range in which the SINR of each UE is located, it may be determined whether it is necessary to adjust the power control parameter of the target AP, adjust the amplitude, and the like. Before the power control parameter in each iteration is adjusted, it is necessary to determine the current SINR of each UE and the target SINRs.

The L target SINRs in each iteration adjustment process may be the same as or different from the L target SINRs adjusted in the previous iteration. For example, if the L target SINRs are determined according to a first threshold parameter set and are independent from the SINR of each terminal, the target SINRs in each iteration adjustment process are the same as the target SINRs adjusted in the previous iteration, that is, the target SINRs are statically configured; if the L target SINRs are determined jointly according to the first threshold parameter set and the SINR of each terminal, the L target SINRs needs to be re-determined according to the current SINR of each terminal in each iteration adjustment process, that is, the target SINRs are dynamically configured.

In operation 130, a power control parameter of a target AP is adjusted according to the SINRs of the terminals and the L target SINRs until an iteration adjustment stop condition is satisfied, and an adjusted power control parameter is obtained.

In this embodiment, according to the SINR of the terminals and the L target SINRs, it may be determined when the power control parameter of the AP need to be adjusted, how much the adjustment amplitude, power control parameters of which APs should be adjusted, whether the adjustment amplitudes are different under different conditions, when to stop adjustment, etc. For one terminal, a target AP corresponding to the one terminal includes at least one of a coordination AP and an interference AP. The coordination AP refers to an AP serving the terminal, and the interference AP refers to an AP causing signal interference to the terminal. In an iteration adjustment process, only a power control parameter of the coordination AP may need to be adjusted or only a power control parameter of the interference AP may need to be adjusted, or power control parameters of both the coordination AP and the interference AP may need to be adjusted. In each iteration adjustment process, the power control parameter of the target AP may be adjusted in a case where it is determined that the iteration adjustment stop condition is not satisfied; or the power control parameter of the target AP may be adjusted first, and then it is determined that whether the iteration adjustment stop condition is satisfied, and if the iteration adjustment stop condition is not satisfied, the next iteration adjustment is performed.

If the target AP sends information to the corresponding UE after adjusting the power control parameter at each time, the UE side may re-estimate its SINR according to the locally received information, and then send its SINR to the communication node, that is, the SINR of each UE may be directly reported by the UE side without the communication node participating in the operation. If during each control parameter adjustment (except for the last adjustment in which the iteration adjustment stop condition is satisfied), the target AP does not send information to the corresponding UE, then the communication node needs to re-determine the SINR of each UE according to the channel information, precoding information, power control information, user data information, coordination set information, noise information, etc.

According to the power control method in this embodiment, under the application scenario in which multiple APs serve multiple terminals at the same time, the power control of multiple Aps is achieved, the interference or gain between a signal source and an interference source can be balanced, and the communication quality can be improved.

In an embodiment, the operation 130 includes that: in a case where the iteration adjustment stop condition is not satisfied, the power control parameter of the target AP is adjusted according to the SINRs of the terminals and the L target SINRs, and the SINRs of the terminals are updated based on the adjusted power control parameter; and repeatedly performing an operation of adjusting the power control parameter and an operation of updating the SINRs until the iteration adjustment stop condition is satisfied.

Figure 2:
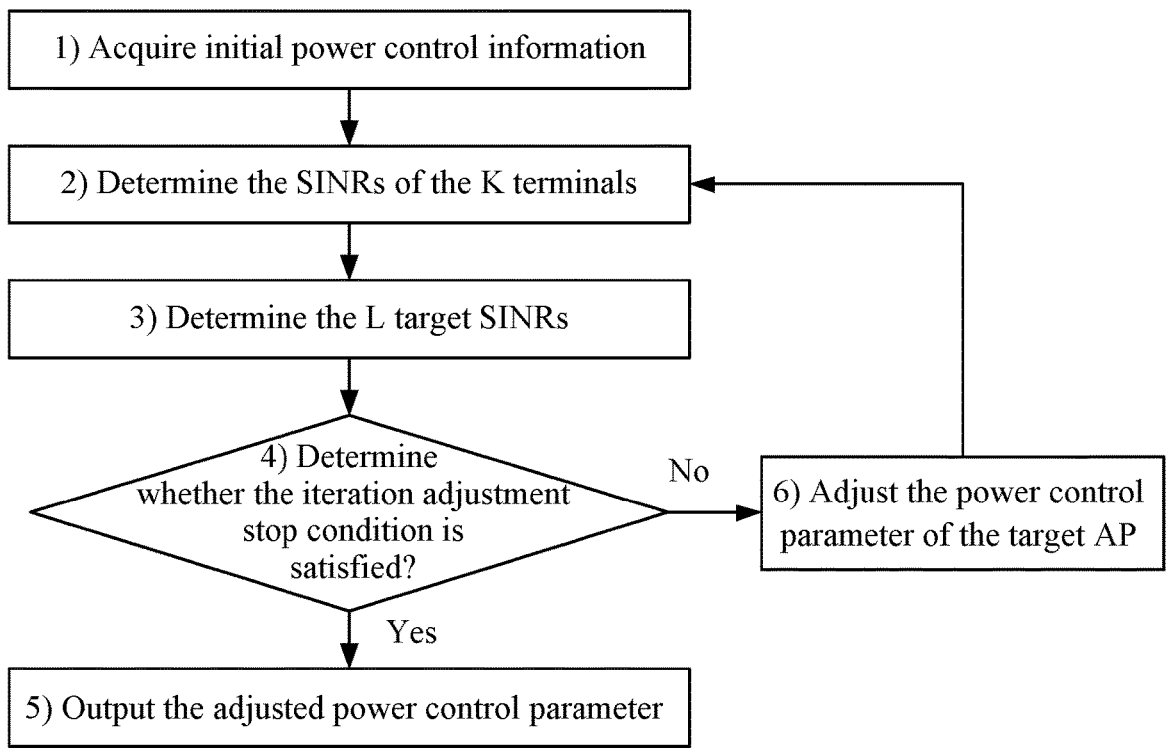
FIG. 2 is a schematic diagram of a power control process according to an embodiment.

In this embodiment, in each iteration adjustment process, the power control parameter of the target AP may be adjusted in a case where it is determined that the iteration adjustment stop condition is not satisfied, thereby avoiding unnecessary adjustment. In a case where the iteration adjustment stop condition is satisfied, the adjustment may be stopped in time, and the final power control parameter is output. FIG. 2 is a schematic diagram of a power control process according to an embodiment. As shown in FIG. 2, the power control process includes the following:

1) acquiring initial power control information;
2) determining the SINRs of the K terminals;
3) determining the L target SINRs;
4) determining whether the iteration adjustment stop condition is satisfied; if the iteration adjustment stop condition is satisfied, go to 5); otherwise, go to 6);
5) outputting the adjusted power control parameter; and
6) adjusting the power control parameter of the target AP, and re-determining the SINRs of the K terminals.

In this case, it is necessary to determine whether the SINR of each terminal corresponding to the initial power control information and the SINR of each terminal updated in the iteration adjustment process satisfy the iteration adjustment stop condition.

In an embodiment, the operation 130 includes that: the power control parameter of the target AP is adjusted according to the SINR of each terminal and the L target SINRs; in a case where the iteration adjustment stop condition is not satisfied, the SINR of each terminal is updated based on the adjusted power control parameter; and repeatedly performing an operation of adjusting the power control parameter and an operation of updating the SINR until the iteration adjustment stop condition is satisfied.

Figure 3:
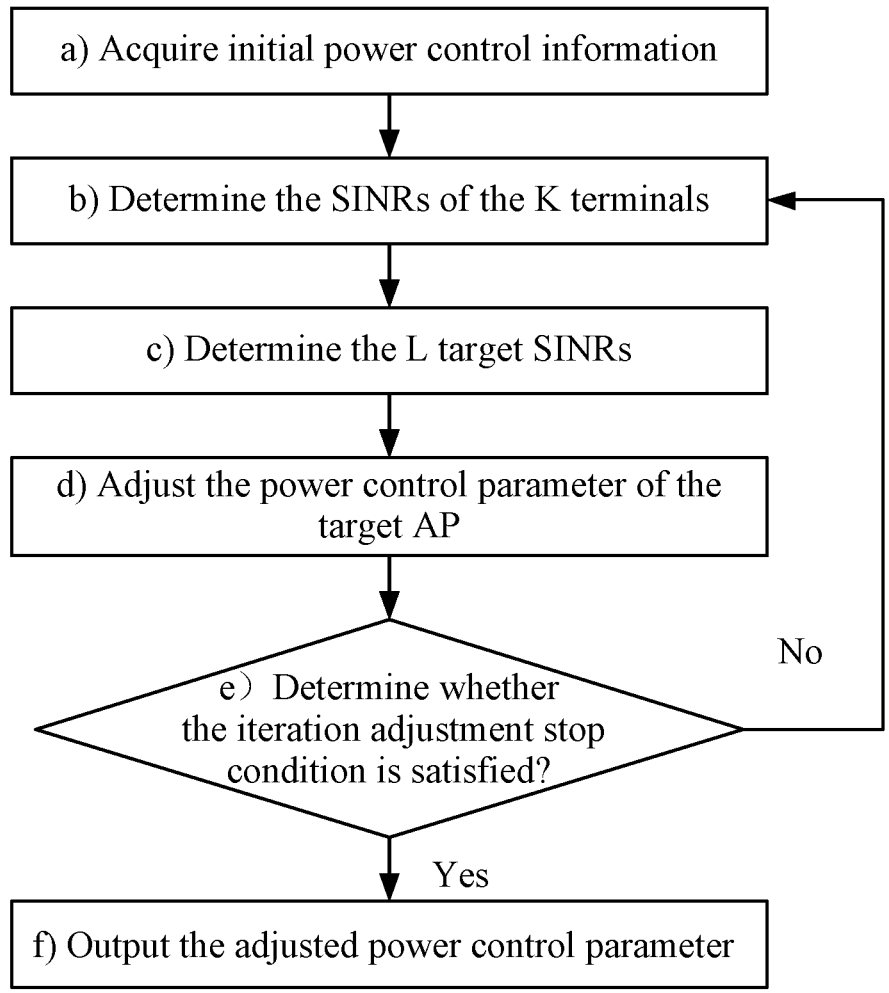
FIG. 3 is a schematic diagram of another power control process according to an embodiment.

In this embodiment, in each iteration adjustment process, the power control parameter of the target AP is first adjusted, then it is determined whether the iteration adjustment stop condition is satisfied, and if the iteration adjustment stop condition is not satisfied, the next iteration adjustment is performed. FIG. 3 is a schematic diagram of another power control process according to an embodiment. As shown in FIG. 3, the power control process includes the following:

a) acquiring initial power control information;
b) determining the SINRs of the K terminals;
c) determining the L target SINRs;
d) adjusting the power control parameter of the target AP;
e) determining whether the iteration adjustment stop condition is satisfied; if the iteration adjustment stop condition is satisfied, go to f); otherwise, go to b), and re-determining the SINRs of the K terminals; and
f) outputting the adjusted power control parameter.

In this case, it is not necessary to determine whether the SINR of each terminal corresponding to the initial power control information satisfies the iteration adjustment stop condition, and the adjustment is performed directly. Whether the iteration adjustment stop condition is satisfied needs to be determined for the SINR of each terminal updated in the iteration adjustment process (except the last iteration adjustment).

In an embodiment, the L target SINRs are determined according to a first threshold parameter set, where the first threshold parameter set includes L elements, and each element represents a target SINR of a level.

In this embodiment, each element in the first threshold parameter set represents an SINR value, and a target SINR may be obtained according to each element. For example, L=2, two elements correspond to two target SINRs, the SINRs of the UEs may be divide into three levels, and three levels correspond to adjustment magnitudes with different degrees.

For example, if three elements $\{\alpha_1, \alpha_2, \alpha_3\}$ are included in the first threshold parameter set, $\alpha_1$, $\alpha_2$ and $\alpha_3$ are all greater than zero, and the number of target SINRs is also three: $TargetSINR_i=\alpha_i$, i=1, 2, 3, where $TargetSINR_1$, $TargetSINR_2$ and $TargetSINR_3$ are statically configured target SINRs.

In an embodiment, the L target SINRs are determined according to the SINR of each terminal and the first threshold parameter set, where the first threshold parameter set includes L elements, and each element represents a scaling factor corresponding to a target SINR of a level.

In this embodiment, a target SINR may be obtained according to each element in the first threshold parameter set, the target SINR is also related to the SINR of each terminal, and each element represents the scaling factor for solving the corresponding target SINR. For example, L=2, and each of two elements is multiplied by a respective reference SINR value and scaled to obtain two corresponding target SINRs. The SINRs of UEs may be divided into three levels, and three levels correspond to adjustment amplitudes with different degrees.

In an embodiment, the operation 120 includes the following.

In operation 121, a baseline SINR is calculated according to the SINR of the terminals.

In operation 122, the baseline SINR is multiplied by each element in the first threshold parameter set to obtain a target SINR of each level.

In this embodiment, the target SINR is jointly determined by the first threshold parameter set and the SINR of each terminal. The baseline SINR in the iteration adjustment process may be calculated and obtained according to the SINR of each UE in each iteration process, for example, the baseline SINR in the iteration adjustment process may be obtained by averaging, maximizing, minimizing, or other operations on the SINRs of K UEs. Since the SINR of each UE is changed in the iteration adjustment process, the baseline SINR may also be changed, and in each iteration process, the target SINR may be changed, thereby achieving the dynamic configuration of the target SINR.

For example, if three elements $(\alpha_1, \alpha_2, \alpha_3)$ are included in the first threshold parameter set, and the number of target SINRs is also three: $TargetSINR_i=\alpha_i*BaseSINR$, i=1, 2, 3 where BaseSINR is the baseline SINR, and $TargetSINR_1$, $TargetSINR_2$ and $TargetSINR_3$, are target SINRs.

In an embodiment, the baseline SINR includes one of the following: an average value of SINRs of the terminals; a maximum value of the SINRs of the terminals, and a minimum value of the SINRs of the terminals.

In an embodiment, the iteration adjustment stop condition includes at least one of the following: the SINRs of the terminals each are greater than a target SINR of a set level (the highest level, the lowest level, or the specified level); the SINRs of the terminals each are greater than a set SINR value; a minimum value of the SINRs of the terminals is greater than a target SINR of a set level (the highest level, the lowest level, or the specified level); a minimum value of the SINRs of the terminals is greater than a set SINR value; a maximum value of the SINRs of the terminals is greater than a target SINR of a set level (the highest level, the lowest level, or the specified level); a maximum value of the SINRs of the terminals is greater than a set SINR value; an average value of the SINRs of the terminals is greater than a target SINR of a set level (the highest level, the lowest level, or the specified level); an average value of the SINRs of the terminals is greater than a set SINR value; a product of the SINRs of the terminals is greater than a target SINR of a set level (the highest level, the lowest level, or the specified level); a product of the SINRs of the various terminals is greater than a set SINR value; a number of terminals of which SINRs are greater than a target SINR of a set level (the highest level, the lowest level, or the specified level) is greater than or equal to F1, where F1 is a positive integer not exceeding K; a number of terminals of which SINRs are greater than a set SINR value is greater than or equal to F2, where F2 is a positive integer not exceeding K; or a number of iteration adjustments reaches a specified value N, where N is a positive integer.

In an embodiment, for each terminal, a target AP corresponding to the each terminal includes a coordination AP.

The operation 130 includes that: for each terminal, a level range to which an SINR of the each terminal belongs is determined according to a relationship between the SINR of the each terminal and the L target SINRs, and an element that is in a second threshold parameter set and corresponds to the level range is multiplied by a power control parameter of the coordination AP corresponding to the each terminal, where the second threshold parameter set includes (L+1) different elements.

In this embodiment, the second threshold parameter set includes (L+1) different elements which respectively represent adjustment amounts for the power control parameter of the target AP in a case where the SINRs of the UEs are in different level ranges, where the target AP refers to the coordinated AP serving the UE.

For example, the second threshold parameter set includes four elements $(\beta_1, \beta_2, \beta_3, \beta_4)$, the level range to which the SINR of each terminal belongs may be determined according to the SINR of the each terminal and the L target SINRs, and the corresponding element in the second threshold parameter set may be determined according to the level range to which the SINR of the each terminal belongs. The power adjustment is performed on the coordination AP of the UE according to the element:

$$w_{\Omega_n,n,t+1} = \begin{cases} \beta_1 * w_{\Omega_n,n,t}, & \text{if } SINR_{n,t+1} < TargetSINR_1 \\ \beta_2 * w_{\Omega_n,n,t}, & \text{else if } SINR_{n,t+1} < TargetSINR_2 \\ \beta_3 * w_{\Omega_n,n,t}, & \text{else if } SINR_{n,t+1} < TargetSINR_3 \\ \beta_4 * w_{\Omega_n,n,t}, & \text{else if } SINR_{n,t+1} > TargetSINR_3 \end{cases}$$

where $SINR_{n,t+1}$ represents the SINR of the $n^{th}$ UE in the $(t+1)$th iteration process, $W_{W_n,n,t}$ represents the power control parameter set of the coordination AP of the $n^{th}$ UE in the $i^{th}$ iteration process, and $W_{\Omega_n,n,t+1}$ represents the power control parameter set of the coordination AP of the $n^{th}$ UE in the $(t+1)^{th}$ iteration process. $\beta_1$, $\beta_2$, $\beta_3$ and $\beta_4$ are all greater than zero. For the $n^{th}$ UE in the $(t+1)^{th}$ iteration process, if the SINR of the UE satisfies $SINR_{n,t+1} < TargetSINR_t$, it indicates that the SINR of the UE is in a first level range, and the first level range corresponds to a first element $\beta_1$ in the second threshold parameter set, whereby the power control parameter set of the coordination AP of the UE is multiplied by $\beta_1$ and adjusted to $\beta_1 * w_{\Omega_n,n,t}$. Similarly, if the SINR of the UE satisfies $TargetSINR_t < SINR_{n,t+1} < TargetSINR_2$, it indicates that the SINR of the UE is in a second level range, and the second level range corresponds to the second element $\beta_2$ in the second threshold parameter set, whereby the power control parameter set of the coordination AP of the UE is multiplied by $\beta_2$ and adjusted to $\beta_2 * w_{\Omega_n,n,t}$, and so on, the adjusted power control parameter of the coordination AP of each UE in the $(t+1)^{th}$ iteration process can be obtained. The level range to which the SINR of the terminal belongs is determined, and the SINR of the terminal is multiplied by the corresponding element in the second threshold parameter set, so that the power control of the coordination AP is achieved, and the flexibility and reliability of the power control are improved.

In the $t^{th}$ iteration adjustment process, the power control parameters between the K UEs and the M APs may be represented by a power control parameter matrix $w_{...,t}$, for example, the power control parameter matrix $w_{...,t}$ is M*K matrix, in which each column represents the power control parameter of APs to one UE, and each row represents the power control parameter of one AP to UEs. In the power control parameter matrix, the term with subscript n represents the related information of the $n^{th}$ UE, the term with subscript m represents the related information of the $m^{th}$ AP, the term with subscript t represents the related information in the $t^{th}$ iteration adjustment process, and the term with subscript $(t+1)$ represents the related information in the $(t+1)^{th}$ iteration adjustment process. If the element in row m and column n is not 0, it indicates that AP m serves a UE n and the allocated power control parameter is $w_{m,n,t}$; if the element in row m and column n is 0, it indicates that AP m does not serve a UE n. $\Omega_n$ n is a coordination AP set of the $n^{th}$ UE.

In an embodiment, for each terminal, a target AP corresponding to the each terminal includes an interference AP.

The operation 130 includes that: for each terminal, a level range to which an SINR of the each terminal belongs is determined according to a relationship between the SINR of the each terminal and the L target SINRs, and an element that is in a third threshold parameter set and corresponds to the level range is multiplied by a power control parameter of the interference AP corresponding to the each terminal, where the third threshold parameter set includes (L+1) different elements.

In this embodiment, the third threshold parameter set includes (L+1) different elements which respectively represent adjustment amounts for the power control parameter of the target AP in a case where the SINRs of the UEs are in different level ranges, where the target AP refers to the interference AP that interferes in the UE.

For example, the third threshold parameter set includes four elements ($\gamma_1$, $\gamma_2$, $\gamma_3$, $\gamma_4$), the level range to which the SINR of each terminal belongs may be determined according to the SINR of the each terminal and the L target SINRs, and the corresponding element in the third threshold parameter set may be determined according to the level range to which the SINR of the each terminal belongs. The power adjustment is performed on the interference AP of the UE according to the element:

$$w_{\Phi_n,n,t+1} = \begin{cases} \gamma_1 * w_{\Phi_n,n,t}, & \text{if } SINR_{n,t+1} < TargetSINR_1 \\ \gamma_2 * w_{\Phi_n,n,t}, & \text{else if } SINR_{n,t+1} < TargetSINR_2 \\ \gamma_3 * w_{\Phi_n,n,t}, & \text{else if } SINR_{n,t+1} < TargetSINR_3 \\ \gamma_4 * w_{\Phi_n,n,t}, & \text{else } SINR_{n,t+1} > TargetSINR_3 \end{cases}$$

where $SINR_{n,\ t+1}$ represents the SINR of the $n^{th}$ UE in the $(t+1)^{th}$ iteration process, $w_{\Phi_n,n,t}$ represents the power control parameter set of the interference AP of the $n^{th}$ UE in the $t^{th}$ iteration process, and $w_{\Phi_n,n,t+1}$ represents the power control parameter set of the interference AP of the $n^{th}$ UE in the $(t+1)^{th}$ iteration process. $\gamma_1$, $\gamma_2$, $\gamma_3$, and $\gamma_4$ are all greater than zero. For the $n^{th}$ UE in the $(t+1)^{th}$ iteration process, if the SINR of the UE satisfies $SINR_{n,\ t+1} < TARGETSINR_1$, it indicates that the SINR of the UE is in a first level range, and the first level range corresponds to a first element $\gamma_1$ in the third threshold parameter set, whereby the power control parameter set of the coordination AP of the UE is multiplied by $\gamma_1$ and adjusted to $\gamma_1 * w_{\Phi_n,n,t}$. Similarly, if the SINR of the UE $TargetSINR_1 < SINR_{n,t+1} < TargetSINR_2$, it indicates that the SINR of the UE is in a second level range, and the second level range corresponds to a second element 72 in the third threshold parameter set, whereby the power control parameter set of the coordination AP of the UE is multiplied by $\gamma_2$ and adjusted to $\gamma_2 * w_{\Phi_n,n,t}$, and so on, the adjusted power control parameter of the coordination AP of each UE in the $(t+1)^{th}$ iteration process can be obtained. The level range to which the SINR of the terminal belongs is determined, and the SINR of the terminal is multiplied by the corresponding element in the third threshold parameter set, so that the power control of the interference AP is achieved, and the flexibility and reliability of the power control are improved.

In an embodiment, for each terminal, a target AP corresponding to the each terminal includes a coordination AP and an interference AP.

The operation 130 includes that: for each terminal, a level range to which an SINR of the each terminal belongs is determined according to a relationship between the SINR of the each terminal and the L target SINRs, an element that is in a second threshold parameter set and corresponds to the level range is multiplied by a power control parameter of the coordination AP corresponding to the each terminal, and an element that is in a third threshold parameter set and corresponds to the level range is multiplied by a power control parameter of the interference AP corresponding to the each terminal, where the second threshold parameter set includes (L+1) different elements, and the third threshold parameter set includes (L+1) different elements.

In this embodiment, the second threshold parameter set includes (L+1) different elements and the third threshold parameter set includes (L+1) different elements, which represents adjustment amounts for the power control parameter of the target AP in a case where the SINRs of the UEs are in different level ranges, where the target AP refers to the interference AP that interferes in the UE and the coordination AP serving the UE.

For example, the second threshold parameter set includes four elements ($\beta_1$, $\beta_2$, $\beta_3$, $\beta_4$), the third threshold parameter set includes four elements ($\gamma_1$, $\gamma_2$, $\gamma_3$, $\gamma_4$), and the level range to which the SINR of each terminal belongs may be determined according to the SINR of the each terminal and the L target SINRs. For the $n^{th}$ UE in the $(t+1)^{th}$ iteration process, the corresponding element in the second threshold parameter set may be determined according to the level range to which the SINR of the UE belongs, and the power adjustment is performed on the coordination AP of the UE according to the element:

$$w_{\Omega_n,n,t+1} = \begin{cases} \beta_1 * w_{\Omega_n,n,t}, & \text{if } SINR_{n,t+1} < TargetSINR_1 \\ \beta_2 * w_{\Omega_n,n,t}, & \text{else if } SINR_{n,t+1} < TargetSINR_2 \\ \beta_3 * w_{\Omega_n,n,t}, & \text{else if } SINR_{n,t+1} < TargetSINR_3 \\ \beta_4 * w_{\Omega_n,n,t}, & \text{else if } SINR_{n,t+1} > TargetSINR_3 \end{cases}.$$

The corresponding element in the third threshold parameter set may be determined according to the level range to which the SINR of the UE belongs, and the power adjustment is performed on the interference AP of the UE according to the element:

$$w_{\Phi_n,n,t+1} = \begin{cases} \gamma_1 * w_{\Phi_n,n,t}, & \text{if} & SINR_{n,t+1} < TargetSINR_1 \\ \gamma_2 * w_{\Phi_n,n,t}, & \text{else if} & SINR_{n,t+1} < TargetSINR_2 \\ \gamma_3 * w_{\Phi_n,n,t}, & \text{else if} & SINR_{n,t+1} < TargetSINR_3 \\ \gamma_4 * w_{\Phi_n,n,t}, & \text{else} & SINR_{n,t+1} > TargetSINR_3 \end{cases}.$$

The level range to which the SINR of the terminal belongs is determined, and the SINR of the terminal is multiplied by the corresponding element in the second threshold parameter set, so that the power control of the coordination AP is achieved; and the SINR of the terminal is multiplied by the corresponding element in the third threshold parameter set, so that the power control of the interference AP is achieved, and thus the flexibility and reliability of the power control are improved.

Both the coordination AP and the interference AP in the above embodiments are defined from the perspective of the power control parameter. For the power control parameter matrix whose dimension is M*K, the $n^{th}$ column corresponds to the power control parameter set of the UE n, and the row directory corresponding to the non-0 element of this column is the service AP of the UE. The $m^{th}$ row corresponds to the power control parameter of the UE served by the AP m, and the column directory corresponding to the non-0 element in this row is the UE served by the AP. For example, if the service AP m of the UE n may serve multiple UEs at the same time, such as the UE j and the UE n at the same time, then the signal sent by the AP m to the UE j is interference for the UE n, that is, for the UE n, the other column elements in the power control parameter matrix except the $n^{th}$ column are interference for the UE n. The coordination AP may also be the interference AP.

In an embodiment, the operation 130 further includes that: in a case where power control parameters of target APs corresponding to all the terminals are adjusted, for each AP, it is determined whether an adjusted power control parameter of the each AP exceeds a power limit range that is in a power constraint set and corresponds to the each AP; and in a case where the adjusted power control parameter of the each AP exceeds the power limit range corresponding to the each AP, the power control parameter of the each AP is adjusted to be within the power limit range corresponding to the each AP, where the power constraint set includes P elements, and P is a positive integer less than or equal to M.

In this embodiment, the power constraint set includes P elements, and the power limit ranges corresponding to M APs may be the same or different. If M APs correspond to the same power limit range, P=1; if the power limit ranges corresponding to M APs are not identical, 1<P<M; if the power limit ranges corresponding to M APs are different from each other, P=M. In a case where 1<P≤M, the communication node needs to further indicate that which element in the power constraint set corresponds to each AP, respectively. The initial power control information determined in any other manner except for the randomly allocating the initial power control parameters does not exceed the maximum power constraint of the APs. Even if the initial power control information exceeds the maximum power constraint of the APs, it can be ensured that the finally outputted power control information does not exceed the maximum power constraint of the APs by adjusting the power limit.

In this embodiment, on the basis of the adjustment of the power control parameters of the target APs of all the UEs, it is further determined whether the power control parameter of each AP of M APs exceeds the corresponding power limit range in the power constraint set. If the power control parameter of the AP exceeds the corresponding power limit range, it is necessary to further limit the power control parameter of the AP within the power limit range.

For example, in the $(t+1)^{th}$ iteration adjustment process, for the power control parameter of the $m^{th}$ AP:

$$w_{m,:,t+1} = \begin{cases} w_{m,:,t+1} / norm(w_{m,:,t+1}), & \text{if } norm(w_{m,:,t+1}) > P_{max} \\ w_{m,:,t+1} & \text{else} \end{cases},$$

where $P_{max}$ is an element in the power constraint set corresponding to this AP, $w_{m,:,t+}$ represents the power control parameters allocated by the $m^{th}$ AP to all the UEs in the $(t+1)^{th}$ iteration process, and $norm(w_{m,:,t+})$ represents the total power of the AP m transmitting signals in the $(t+1)^{th}$ iteration process. The power control parameter of the AP is within the corresponding power limit range in the third threshold parameter set through adjustment.

In the above embodiment, for the $n^{th}$ terminal and the $m^{th}$ AP, $w_{\Phi_n,n,t}$ represents the power control parameter set of the coordination AP and is a column vector, and the dimension of it is M*1; $w_{\Phi_n,n,t}$ is a submatrix excluding the $n^{th}$ column (the column where the power control parameter set of the coordination AP of the UE is located) and the dimension of it is M*(K−1); and $w_{m,:,t}$ represents the power control parameters of the $m^{th}$ AP to all the UEs and is a row vector, and the dimension of it is 1*K. In this case, the preceding vector or matrix includes zero element (the power control parameter is 0, representing that the corresponding base station does not serve the corresponding UE). Since values of the non-zero elements may affect the result of the final power adjustment, and zero elements do not affect the result of the power adjustment, for ease of uniform processing, zero elements are reserved for the power control parameter regardless of the perspective of the AP or UE, i.e., the matrix of the power control parameters is a matrix of M*K. In some embodiments, it is also possible to remove zero elements in $w_{\Phi_n,n,t}$, $w_{\Phi_n,n,t}$ and $w_{m,:,t}$, that is, for each UE, only the corresponding column of the corresponding target AP may be extracted to perform the above operation.

In the above embodiment, the power control process mainly includes two parts, the first part is to adjust the power control parameter of the target AP of the UE, and the second part is to ensure that the total power of the APs does not exceed the corresponding power limit range. The first part belongs to the adjustment of the UE levels, that is, the power control parameter of the target AP is adjusted for each UE, which is equivalent to adjusting the column corresponding to each UE in the power control parameter matrix. The K UEs need to be adjusted for K times, and the adjustment sequence for the K UEs is not limited. The second part belongs to the adjustment of the AP levels, that is, on the basis of adjusting the power control parameter of the target AP for each UE, each AP is further adjusted according to the corresponding power limit range, which is equivalent to adjusting the rows corresponding to the APs in the power control parameter matrix, and it is determined whether the total power of the APs exceeds the power limit range. If the total power does not exceed the power limit range, no adjustment is required; if the total power exceeds the power limit range, the total power of the APs is limited to the power limit range by adjusting the power control parameters of the APs. The adjustment sequence of the power control parameter for each AP is not limited.

Figure 4:
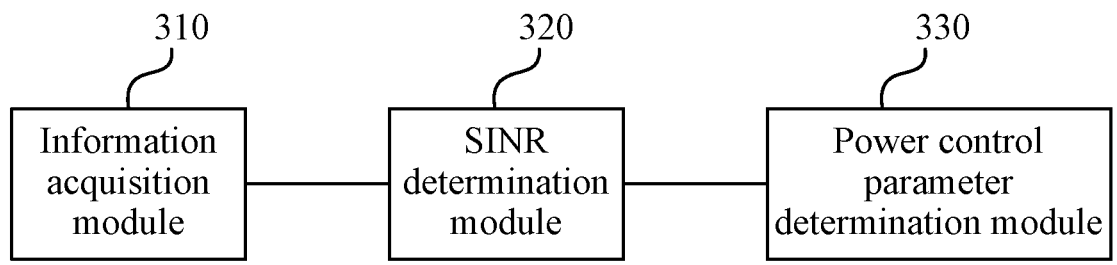
FIG. 4 is a structural diagram of a power control apparatus according to an embodiment.

An embodiment of the present application further provides a power control apparatus. FIG. 4 is a structural diagram of a power control apparatus according to an embodiment. As shown in FIG. 4, the power control apparatus includes an information acquisition module 310, an SINR determination module 320 and a power control parameter determination module 330.

The information acquisition module 310 is configured to acquire initial power control information, where the initial power control information includes a power control parameter of each AP providing a service for each terminal. The SINR determination module 320 is configured to determine SINRs of K terminals according to the initial power control information, and determine L target SINRs, where K is a positive integer, and L is a positive integer. The power control parameter determination module 330 is configured to adjust a power control parameter of a target AP according to the SINRs of the K terminals and the L target SINRs until an iteration adjustment stop condition is satisfied, and obtain an adjusted power control parameter.

According to the power control apparatus in this embodiment, under the application scenario in which multiple APs serve multiple terminals at the same time, the power control of multiple signal sources and multiple interference sources is achieved, and the reliability of the power control is improved.

In an embodiment, the power control parameter determination module 330 is configured to: in a case where the iteration adjustment stop condition is not satisfied, adjust the power control parameter of the target AP according to the SINRs of the terminals and the L target SINRs, and update the SINRs of the terminals based on the adjusted power control parameter; and repeatedly perform an operation of adjusting the power control parameter and an operation of updating the SINRs until the iteration adjustment stop condition is satisfied.

In an embodiment, the power control parameter determination module 330 is configured to: adjust the power control parameter of the target AP according to the SINRs of the terminals and the L target SINRs; in a case where the iteration adjustment stop condition is not satisfied, update the SINRs of the terminals based on the adjusted power control parameter; and repeatedly perform an operation of adjusting the power control parameter and an operation of updating the SINRs until the iteration adjustment stop condition is satisfied.

In an embodiment, the L target SINRs are determined according to a first threshold parameter set, where the first threshold parameter set includes L elements, and each element represents a target SINR of a level.

In an embodiment, the L target SINRs are determined according to the SINRs of the terminals and the first threshold parameter set, where the first threshold parameter set includes L elements, and each element represents a scaling factor corresponding to a target SINR of a level.

In an embodiment, the SINR determination module 320 includes a calculation unit and a power control unit.

The calculation unit is configured to calculate a baseline SINR according to the SINRs of the terminals. The power control unit is configured to multiply the baseline SINR by each element in the first threshold parameter set to obtain a target SINR of each level.

In an embodiment, the baseline SINR includes one of the following an average value of the SINRs of the terminals, a maximum value of the SINRs of the terminals or a minimum value of the SINRs of the terminals.

In an embodiment, the iteration adjustment stop condition includes at least one of the following: the SINRs of the terminals each are greater than a target SINR of a set level; the SINRs of the terminals each are greater than a set SINR value; a minimum value of the SINRs of the terminals is greater than a target SINR of a set level; a minimum value of the SINRs of the terminals is greater than a set SINR value; a maximum value of the SINRs of the terminals is greater than a target SINR of a set level; a maximum value of the SINRs of the terminals is greater than a set SINR value; an average value of the SINRs of the terminals is greater than a target SINR of a set level; an average value of the SINRs of the terminals is greater than a set SINR value; a product of the SINRs of the terminals is greater than a target SINR of a set level; a product of the SINRs of the terminals is greater than a set SINR value; a number of terminals of which SINRs are greater than a target SINR of a set level is greater than or equal to F1, where F1 is a positive integer not exceeding K; a number of terminals of which SINRs are greater than a set SINR value is greater than or equal to F2, where F2 is a positive integer not exceeding K; or a number of iteration adjustments reaches a specified value N, where N is a positive integer.

In an embodiment, for each terminal, a target AP corresponding to the each terminal includes a coordination AP. The power control parameter determination module 330 is configured to: for each terminal, determine a level range to which an SINR of the each terminal belongs according to a relationship between the SINR of the each terminal and the L target SINRs, and multiply an element that is in a second threshold parameter set and corresponds to the level range by a power control parameter of the coordination AP corresponding to the each terminal, where the second threshold parameter set includes (L+1) different elements.

In an embodiment, for each terminal, a target AP corresponding to the each terminal includes an interference AP. The power control parameter determination module 330 is configured to: for each terminal, determine a level range to which an SINR of the each terminal belongs according to a relationship between the SINR of the each terminal and the L target SINRs, and multiply an element that is in a third threshold parameter set and corresponds to the level range by a power control parameter of the interference AP corresponding to the each terminal, where the third threshold parameter set includes (L+1) different elements.

In an embodiment, for each terminal, a target AP corresponding to the each terminal includes a coordination AP and an interference AP. The power control parameter determination module 330 is configured to: for each terminal, determine a level range to which an SINR of the each terminal belongs according to a relationship between the SINR of the each terminal and the L target SINRs, multiply an element that is in a second threshold parameter set and corresponds to the level range by a power control parameter of the coordination AP corresponding to the each terminal, and multiply an element that is in a third threshold parameter set and corresponds to the level range by a power control parameter of the interference AP corresponding to the each terminal, where the second threshold parameter set includes (L+1) different elements, and the third threshold parameter set includes (L+1) different elements.

In an embodiment, the power control parameter determination module 330 further includes a power limit unit and is configured to: in a case where power control parameters of target APs corresponding to all the UEs are adjusted, for each AP, determine whether an adjusted power control parameter of the each AP exceeds a power limit range that is in a power constraint set and corresponds to the each AP, and in a case where the adjusted power control parameter of the each AP exceeds the power limit range corresponding to the each AP, adjust the power control parameter of the each AP to be within the power limit range corresponding to the each AP, where the power constraint set includes P elements, and P is a positive integer less than or equal to M.

The power control apparatus provided in the embodiment and the power control method provided in the preceding embodiment belong to the same inventive concept. For technical details not described in detail in the embodiment, reference may be made to any one of the preceding embodiments, and the embodiment has the same effects as executing the power control method.

An embodiment of the present application further provides a communication node. The power control method may be performed by the power control apparatus which may be implemented by software and/or hardware and integrated in the communication node. The communication node includes, but is not limited to, a terminal side device, a network side device and a centralized control device. The communication node provided by this embodiment includes one or more processors. The processors, when executing, implements the power control method of any one of preceding embodiment.

In an embodiment, the communication node further includes a storage apparatus, which is configured to store one or more programs.

Figure 5:
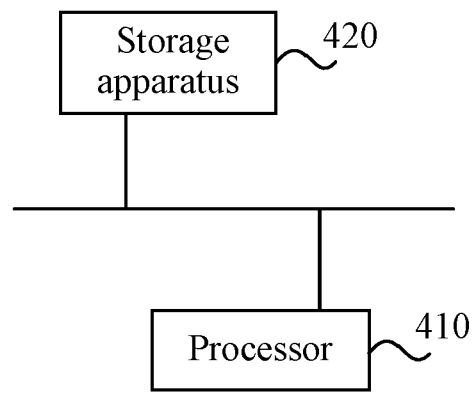
FIG. 5 is a structural diagram of hardware of a communication node according to an embodiment.

FIG. 5 is a structural diagram of hardware of a communication node according to an embodiment. One processor 410 is shown as an example in FIG. 5. The processor 410 and the storage apparatus 420 in the device may be connected via a bus or in other manners. The connection via a bus is shown as an example in FIG. 5. The stored one or more programs, when executed by the one or more processors 410, cause the one or more processors 410 to implement the power control method of any one of the preceding embodiments.

The storage apparatus 420 in the communication node, as a computer-readable storage medium, may be configured to store one or more programs which may be software programs, computer-executable programs, and modules, such as program instructions/modules (for example, the following modules in the power control apparatus: the information acquisition module 310, the SINR determination module 320 and the power control parameter determination module 330, as shown in FIG. 4) corresponding to the power control method in embodiments of the present application. The processor 410 executes software programs, instructions, and modules stored in the storage apparatus 420 to perform various function applications and data processing of the communication node, that is, to implement the power control method in the preceding method embodiments.

The storage apparatus 420 mainly includes a program storage region and a data storage region. The program storage region may store an operating system and an application program required by at least one function. The data storage region may store data (such as initial power control information and a target SINR in the preceding embodiments) created based on the use of the device. Additionally, the storage apparatus 420 may include a high-speed random-access memory and may further include a non-volatile memory, such as at least one magnetic disk memory, a flash memory or another non-volatile solid-state memory. In some examples, the storage apparatus 420 may include memories which are remotely disposed with respect to the processor 410. These remote memories may be connected to the communication node via a network. Examples of the above network include, but are not limited to, the Internet, an intranet, a local area network, a mobile communication network and a combination thereof.

When one or more programs included in the communication node are executed by the one or more processor 410, the following operations are implemented. Initial power control information is acquired, where the initial power control information includes a power control parameter of each of APs providing a service for each of terminals, the number of the terminals is K, K is an integer greater than 1, the number of the access points is M, and M is an integer greater than 1. SINRs of the K terminals are determined according to the initial power control information, and L target SINRs are determined, where L is a positive integer. A power control parameter of a target is adjusted according to the SINRs of the K terminals and the L target SINRs until an iteration adjustment stop condition is satisfied, and an adjusted power control parameter is obtained.

The communication node provided in the embodiment and the power control method provided in the preceding embodiment belong to the same inventive concept. For technical details not described in detail in the embodiment, reference may be made to any one of the preceding embodiments, and the embodiment has the same effects as executing the power control method.

Embodiments of the present application further provide a storage medium containing computer-executable instructions that, when executed by a processor of a computer, is configured to perform a power control method.

The method includes: acquiring initial power control information, where the initial power control information includes a power control parameter of each of APs providing a service for each of terminals, the number of the terminals is K, K is an integer greater than 1, the number of the access points is M, and M is an integer greater than 1; determining SINRs of the K terminals according to the initial power control information and determining L target SINRs, where L is a positive integer; and adjusting a power control parameter of a target AP according to the SINRs of the K terminals and the L target SINRs until an iteration adjustment stop condition is satisfied, and an adjusted power control parameter is obtained.

From the preceding description of the embodiments, the present application may be implemented by means of both software and general-purpose hardware, and also by means of hardware. The technical solutions of the present application may be embodied in the form of a software product. The software product in a computer may be stored in a computer-readable storage medium such as a floppy disk, read-only memory (ROM), random-access memory (RAM), flash memory, hard disk or optical disc in the computer and includes multiple instructions for enabling a computer device (which may be a personal computer, a server or a network device) to execute the method of any embodiment of the present application.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, such as, but not limited to, a read-only memory (ROM), a random-access memory (RAM), and an optical memory device and system (a digital video disc (DVD) or a compact disk (CD)). Computer-readable media may include non-transitory storage media. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A power control method, comprising:
    acquiring initial power control information, wherein the initial power control information comprises a power control parameter of each of access points (APs) providing a service for each of terminals, a number of the terminals is K, K is an integer greater than 1, a number of the APs is M, and M is an integer greater than 1;
    determining signal to interference plus noise ratios (SINRs) of the K terminals according to the initial power control information, and determining L target SINRs, wherein L is a positive integer; and
    adjusting a power control parameter of a target AP in the M APs according to the SINRs of the K terminals and the L target SINRs until an iteration adjustment stop condition is satisfied, and obtaining an adjusted power control parameter;
    wherein for each terminal of the K terminals, a target AP corresponding to the each terminal comprises an interference AP; and
    wherein adjusting the power control parameter of the target AP in the M APs according to the SINRs of the K terminals and the L target SINRs comprises:
    for each terminal of the K terminals, determining a level range to which an SINR of the each terminal belongs according to a relationship between the SINR of the each terminal and the L target SINRs; and
    multiplying an element that is in a third threshold parameter set and corresponds to the level range by a power control parameter of the interference AP corresponding to the each terminal;
    wherein the third threshold parameter set comprises (L+1) different elements.

2. The power control method of claim 1, wherein adjusting the power control parameter of the target AP in the M APs according to the SINRs of the K terminals and the L target SINRs until the iteration adjustment stop condition is satisfied comprises:
    in a case where the iteration adjustment stop condition is not satisfied, adjusting the power control parameter of the target AP in the M APs according to the SINRs of the K terminals and the L target SINRs, and updating the SINRs of the K terminals based on the adjusted power control parameter; and
    repeatedly performing an operation of adjusting the power control parameter and an operation of updating the SINRs until the iteration adjustment stop condition is satisfied.

3. The power control method of claim 1, wherein adjusting the power control parameter of the target AP in the M APs according to the SINRs of the K terminals and the L target SINRs until the iteration adjustment stop condition is satisfied comprises:
    adjusting the power control parameter of the target AP in the M APs according to the SINRs of the K terminals and the L target SINRs;
    in a case where the iteration adjustment stop condition is not satisfied, updating the SINRs of the K terminals based on the adjusted power control parameter; and
    repeatedly performing an operation of adjusting the power control parameter and an operation of updating the SINRs until the iteration adjustment stop condition is satisfied.

4. The power control method of claim 1, wherein the L target SINRs are determined according to a first threshold parameter set, wherein the first threshold parameter set comprises L elements, and each element of the L elements represents a target SINR of a level.

5. The power control method of claim 1, wherein the L target SINRs are determined according to the SINRs of the K terminals and a first threshold parameter set, wherein the first threshold parameter set comprises L elements, and each element of the L elements represents a scaling factor corresponding to a target SINR of a level.

6. The power control method of claim 5, wherein determining the L target SINRs comprises:
    calculating a baseline SINR according to the SINRs of the K terminals; and
    multiplying the baseline SINR by each element in the first threshold parameter set to obtain a target SINR of a level corresponding to the each element.

7. The power control method of claim 6, wherein the baseline SINR comprises one of the following:
    an average value of the SINRs of the K terminals;
    a maximum value of the SINRs of the K terminals; or
    a minimum value of the SINRs of the K terminals.

8. The power control method of claim 1, wherein the iteration adjustment stop condition comprises at least one of the following:
    the SINRs of the K terminals each are greater than a target SINR of a set level;

the SINRs of the K terminals each are greater than a set SINR value;
a minimum value of the SINRs of the K terminals is greater than a target SINR of a set level;
a minimum value of the SINRs of the K terminals is greater than a set SINR value;
a maximum value of the SINRs of the K terminals is greater than a target SINR of a set level;
a maximum value of the SINRs of the K terminals is greater than a set SINR value;
an average value of the SINRs of the K terminals is greater than a target SINR of a set level;
an average value of the SINRs of the K terminals is greater than a set SINR value;
a product of the SINRs of the K terminals is greater than a target SINR of a set level;
a product of the SINRs of the K terminals is greater than a set SINR value;
a number of terminals of which SINRs are greater than a target SINR of a set level is greater than or equal to F1, wherein F1 is a positive integer not exceeding K;
a number of terminals of which SINRs are greater than a set SINR value is greater than or equal to F2, wherein F2 is a positive integer not exceeding K; or
a number of iteration adjustments reaches a specified value N, wherein N is a positive integer.

9. A non-transitory computer-readable storage medium, which is configured to store a computer program, wherein the computer program, when executed by a processor, implements the power control method of claim 1.

10. The power control method of claim 1, wherein adjusting the power control parameter of the target AP in the M APs according to the SINRs of the K terminals and the L target SINRs further comprises:
in a case where power control parameters of target APs corresponding to all the K terminals are adjusted, for each AP of the M APs, determining whether an adjusted power control parameter of the each AP exceeds a power limit range that is in a power constraint set and corresponds to the each AP; and
in a case where the adjusted power control parameter of the each AP exceeds the power limit range corresponding to the each AP, adjusting the power control parameter of the each AP to be within the power limit range corresponding to the each AP;
wherein the power constraint set comprises P elements, and P is a positive integer less than or equal to M.

11. A power control method, comprising:
acquiring initial power control information, wherein the initial power control information comprises a power control parameter of each of access points (APs) providing a service for each of terminals, a number of the terminals is K, K is an integer greater than 1, a number of the APs is M, and M is an integer greater than 1;
determining signal to interference plus noise ratios (SINRs) of the K terminals according to the initial power control information, and determining L target SINRs, wherein L is a positive integer; and
adjusting a power control parameter of a target AP in the M APs according to the SINRs of the K terminals and the L target SINRs until an iteration adjustment stop condition is satisfied, and obtaining an adjusted power control parameter;
wherein for each terminal of the K terminals, a target AP corresponding to the each terminal comprises a coordination AP and an interference AP; and wherein adjusting the power control parameter of the target AP in the M APs according to the SINRs of the K terminals and the L target SINRs comprises:
for each terminal of the K terminals, determining a level range to which an SINR of the each terminal belongs according to a relationship between the SINR of the each terminal and the L target SINRs;
multiplying an element that is in a second threshold parameter set and corresponds to the level range by a power control parameter of the coordination AP corresponding to the each terminal; and
multiplying an element that is in a third threshold parameter set and corresponds to the level range by a power control parameter of the interference AP corresponding to the each terminal;
wherein the second threshold parameter set comprises (L+1) different elements, and the third threshold parameter set comprises (L+1) different elements.

12. The power control method of claim 11, wherein adjusting the power control parameter of the target AP in the M APs according to the SINRs of the K terminals and the L target SINRs further comprises:
in a case where power control parameters of target APs corresponding to all the K terminals are adjusted, for each AP of the M APs, determining whether an adjusted power control parameter of the each AP exceeds a power limit range that is in a power constraint set and corresponds to the each AP; and
in a case where the adjusted power control parameter of the each AP exceeds the power limit range corresponding to the each AP, adjusting the power control parameter of the each AP to be within the power limit range corresponding to the each AP;
wherein the power constraint set comprises P elements, and P is a positive integer less than or equal to M.

13. A communication node, comprising:
at least one processor, which is configured to perform, when executing, the power control method of claim 11.

14. A non-transitory computer-readable storage medium, which is configured to store a computer program, wherein the computer program, when executed by a processor, implements the power control method of claim 11.

15. The power control method of claim 11, wherein adjusting the power control parameter of the target AP in the M APs according to the SINRs of the K terminals and the L target SINRs until the iteration adjustment stop condition is satisfied comprises:
in a case where the iteration adjustment stop condition is not satisfied, adjusting the power control parameter of the target AP in the M APs according to the SINRs of the K terminals and the L target SINRs, and updating the SINRs of the K terminals based on the adjusted power control parameter; and
repeatedly performing an operation of adjusting the power control parameter and an operation of updating the SINRs until the iteration adjustment stop condition is satisfied.

16. A communication node, comprising:
at least one processor, which is configured to perform, when executing, the following:
acquiring initial power control information, wherein the initial power control information comprises a power control parameter of each of access points (APs) providing a service for each of terminals, a number of the terminals is K, K is an integer greater than 1, a number of the APs is M, and M is an integer greater than 1;

determining signal to interference plus noise ratios (SINRs) of the K terminals according to the initial power control information, and determining L target SINRs, wherein L is a positive integer; and adjusting a power control parameter of a target AP in the M APs according to the SINRs of the K terminals and the L target SINRs until an iteration adjustment stop condition is satisfied, and obtaining an adjusted power control parameter;

wherein for each terminal of the K terminals, a target AP corresponding to the each terminal comprises an interference AP; and wherein adjusting the power control parameter of the target AP in the M APs according to the SINRs of the K terminals and the L target SINRs comprises:

for each terminal of the K terminals, determining a level range to which an SINR of the each terminal belongs according to a relationship between the SINR of the each terminal and the L target SINRs; and multiplying an element that is in a third threshold parameter set and corresponds to the level range by a power control parameter of the interference AP corresponding to the each terminal;

wherein the third threshold parameter set comprises (L+1) different elements.

17. The communication node of claim 16, wherein the at least one processor, which is configured to perform adjusting the power control parameter of the target AP in the M APs according to the SINRs of the K terminals and the L target SINRs until the iteration adjustment stop condition is satisfied in the following way:

in a case where the iteration adjustment stop condition is not satisfied, adjusting the power control parameter of the target AP in the M APs according to the SINRs of the K terminals and the L target SINRs, and updating the SINRs of the K terminals based on the adjusted power control parameter; and repeatedly performing an operation of adjusting the power control parameter and an operation of updating the SINRs until the iteration adjustment stop condition is satisfied.

18. The communication node of claim 16, wherein the at least one processor, which is configured to perform adjusting the power control parameter of the target AP in the M APs according to the SINRs of the K terminals and the L target SINRs until the iteration adjustment stop condition is satisfied in the following way:

adjusting the power control parameter of the target AP in the M APs according to the SINRs of the K terminals and the L target SINRs;

in a case where the iteration adjustment stop condition is not satisfied, updating the SINRs of the K terminals based on the adjusted power control parameter; and repeatedly performing an operation of adjusting the power control parameter and an operation of updating the SINRs until the iteration adjustment stop condition is satisfied.

19. The communication node of claim 16, wherein the L target SINRs are determined according to a first threshold parameter set, wherein the first threshold parameter set comprises L elements, and each element of the L elements represents a target SINR of a level.

20. The communication node of claim 16, wherein the L target SINRs are determined according to the SINRs of the K terminals and a first threshold parameter set, wherein the first threshold parameter set comprises L elements, and each element of the L elements represents a scaling factor corresponding to a target SINR of a level.

* * * * *